US011619338B2

(12) United States Patent
Guo et al.

(10) Patent No.: US 11,619,338 B2
(45) Date of Patent: Apr. 4, 2023

(54) FOLDABLE GIMBAL PHOTOGRAPHING DEVICE

(71) Applicant: SZ DJI TECHNOLOGY CO., LTD., Shenzhen (CN)

(72) Inventors: Shengjia Guo, Shenzhen (CN); Yin Tang, Shenzhen (CN); Xing Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 401 days.

(21) Appl. No.: 16/718,850

(22) Filed: Dec. 18, 2019

(65) Prior Publication Data

US 2020/0124228 A1   Apr. 23, 2020

Related U.S. Application Data

(63) Continuation of application No. PCT/CN2017/112677, filed on Nov. 23, 2017.

(30) Foreign Application Priority Data

Sep. 29, 2017   (CN) .......................... 201721271096.0

(51) Int. Cl.
*H04N 5/225* (2006.01)
*B64C 39/02* (2006.01)
(Continued)

(52) U.S. Cl.
CPC ......... *F16M 11/123* (2013.01); *G03B 17/561* (2013.01); *H04N 5/2253* (2013.01); (Continued)

(58) Field of Classification Search
CPC ........... F16M 11/123; F16M 2200/024; H04N 5/225251; H04N 5/2253; G03B 17/561
(Continued)

(56) References Cited

U.S. PATENT DOCUMENTS 5,845,166 A * 12/1998 Fellegara ............... G03B 19/00
396/429
6,411,332 B1 * 6/2002 Whitby ................ H04N 5/2251
348/E5.025
(Continued)

FOREIGN PATENT DOCUMENTS

CN         2687476 Y      3/2005
CN       101331815 A    12/2008
(Continued)

OTHER PUBLICATIONS

The World Intellectual Property Organization (WIPO) International Search Report for PCT/CN2017/112677 dated Jul. 5, 2018 6 pages.
(Continued)

*Primary Examiner* — Usman A Khan
(74) *Attorney, Agent, or Firm* — Anova Law Group, PLLC (57) ABSTRACT

A gimbal photographing device includes a fuselage; a folding mechanism, connected to the fuselage; and a gimbal camera, connected to the folding mechanism. The gimbal camera is foldable and unfoldable relative to the fuselage via the folding mechanism. A power switch is disposed on the fuselage. The folding mechanism includes a base connected to the gimbal camera. When the gimbal camera is unfolded relative to the fuselage, the base is configured to abut against the power switch to turn on the gimbal photographing device.

20 Claims, 10 Drawing Sheets

(51) Int. Cl.
  *G03B 17/56* (2021.01)
  *F16M 11/12* (2006.01)
  *F16M 11/18* (2006.01)
(52) U.S. Cl.
  CPC ....... *H04N 5/225251* (2018.08); *F16M 11/18* (2013.01); *F16M 2200/024* (2013.01)
(58) Field of Classification Search
  USPC .................................................. 348/333.06
  See application file for complete search history.

(56) References Cited

U.S. PATENT DOCUMENTS

| | | | | |
|---|---|---|---|---|
| 2006/0067677 | A1* | 3/2006 | Tokiwa | G03B 17/38 396/502 |
| 2008/0071431 | A1* | 3/2008 | Dockter | G05D 1/0684 701/3 |
| 2008/0253687 | A1* | 10/2008 | Zhang | H04N 5/232945 382/284 |
| 2010/0201801 | A1* | 8/2010 | Maruyama | H04N 5/23212 348/335 |
| 2010/0265388 | A1* | 10/2010 | Soumi | H04N 1/2158 396/539 |
| 2014/0009566 | A1* | 1/2014 | Odanaka | H04N 7/18 348/373 |
| 2014/0037278 | A1* | 2/2014 | Wang | F16M 11/2071 396/55 |
| 2015/0377405 | A1* | 12/2015 | Down | B64C 17/06 244/76 R |
| 2016/0352992 | A1* | 12/2016 | Saika | F16M 11/18 |
| 2017/0013228 | A1* | 1/2017 | Kalendra | H04N 5/232411 |
| 2017/0064176 | A1* | 3/2017 | Kim | F16M 11/10 |
| 2017/0302852 | A1* | 10/2017 | Lam | H04N 5/2252 |
| 2018/0106422 | A1* | 4/2018 | Saika | F16M 11/121 |
| 2018/0327092 | A1 | 11/2018 | Deng et al. | |
| 2019/0098191 | A1* | 3/2019 | Enke | H04N 5/23287 |
| 2019/0154191 | A1* | 5/2019 | Ma | F16M 11/123 |
| 2019/0215457 | A1* | 7/2019 | Enke | G08G 5/0069 |
| 2019/0339595 | A1* | 11/2019 | Liu | F16M 11/18 |

FOREIGN PATENT DOCUMENTS

| | | |
|---|---|---|
| CN | 201748120 U | 2/2011 |
| CN | 202166817 U | 3/2012 |
| CN | 202205015 U | 4/2012 |
| CN | 202972432 U | 6/2013 |
| CN | 105035303 A | 11/2015 |
| CN | 204852862 U | 12/2015 |
| CN | 204901238 U | 12/2015 |
| CN | 205155491 U | 4/2016 |
| CN | 205584326 U | 9/2016 |
| CN | 205592616 U | 9/2016 |
| CN | 205979046 U | 2/2017 |
| CN | 206002825 U | 3/2017 |
| CN | 206018229 U | 3/2017 |
| CN | 106764305 A | 5/2017 |
| CN | 206301136 U | 7/2017 |
| CN | 206458995 U | 9/2017 |
| GB | 2479995 B | 7/2013 |
| JP | 2003250065 A | 9/2003 |
| JP | 3098810 U | 3/2004 |
| JP | 3664039 B2 * | 6/2005 |
| WO | 2010130169 A1 | 11/2010 |

OTHER PUBLICATIONS

The World Intellectual Property Organization (WIPO) International Search Report for PCT/CN2017/112679 dated Jan. 26, 2018 5 pages.

* cited by examiner

FOLDABLE GIMBAL PHOTOGRAPHING DEVICE

CROSS-REFERENCE TO RELATED APPLICATIONS

This application is a continuation of International Application No. PCT/CN2017/112677, filed on Nov. 23, 2017, which claims the priority of Chinese Patent Application No. CN201721271096.0, filed on Sep. 29, 2017, the entire contents of both of which are incorporated herein by reference.

TECHNICAL FIELD

The present disclosure relates to the field of gimbal technologies and, more particularly, to a gimbal photographing device.

BACKGROUND

In existing technologies, a gimbal photographing device or a handheld gimbal photographing device can capture stable images in a moving state, thus it is favored by a large number of users. The gimbal photographing device uses a gyroscope and motors to stabilize a camera's photographing device, and thus to stabilize image photographing.

The gimbal photographing device usually includes a fuselage, and a gimbal camera mounted on the fuselage. To facilitate the storage and carrying of the gimbal, the gimbal camera can be folded relative to the fuselage under adjustment of external forces. When the gimbal camera needs to be used, it is necessary to manually rotate the gimbal camera, and then additionally trigger a power switch to turn on the gimbal photographing device. This operation is cumbersome, and the gimbal photographing device has a long turning-on time, resulting in poor user experience.

SUMMARY

According to embodiments of the present disclosure, a gimbal photographing device is provided, including: a fuselage, a folding mechanism connected to the fuselage, and a gimbal camera connected to the folding mechanism. The gimbal camera is foldable and unfoldable relative to the fuselage, via the folding mechanism. The gimbal photographing device further includes a power switch disposed on the fuselage. The folding mechanism includes a base connected to the gimbal camera. When the gimbal camera is unfolded relative to the fuselage, the base abuts against the power switch, to turn on the gimbal photographing device.

The technical solution provided by the embodiments of the present disclosure may include the following beneficial effects. For example, the disclosed gimbal photographing device can be automatically turned on, and can realize a folding function of the gimbal camera by using the base of the folding mechanism to drive the gimbal camera to switch between the unfolded state and the folded state, so that the gimbal photographing device is convenient to carry and store, and has an integrated and compact structure design. In the present disclosure, a power switch is provided on the fuselage, and the base is used to trigger the power switch when the gimbal camera is unfolded relative to the fuselage. The gimbal photographing device is thus automatically triggered to be turned on when the gimbal camera is in use.

It should be understood that the above general description and the following detailed description are merely exemplary and explanatory, and are not limiting of the present disclosure.

BRIEF DESCRIPTION OF THE DRAWINGS

To more clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

Technical solutions in the embodiments of the present disclosure are described clearly and completely in the following with reference to the accompanying drawings in the embodiments of the present disclosure. It is obvious that the described embodiments are only a part of the embodiments of the present disclosure, but not all embodiments. On the basis of the embodiments of the present disclosure, all other embodiments conceived without inventive efforts by those having ordinary skills in the art are within the scope of the present disclosure.

In view of the problems that a gimbal camera is swaying at random, has unstable structure, and is not convenient to carry, when a gimbal photographing device is not in operation, the present disclosure provides a gimbal photographing device that takes up less space and is easy to carry when not in operation. Structures of the gimbal photographing device of the present disclosure will be described in detail below with reference to the accompanying drawings, and the following embodiments and the features of the embodiments may be combined with each other without conflict.

The present disclosure provides a gimbal photographing device that can be automatically turned on to solve the above technical problems. For example, a gimbal photographing device may include a fuselage, a folding mechanism connected to the fuselage, and a gimbal camera connected to the folding mechanism. The gimbal camera is foldable and unfoldable relative to the fuselage by the folding mechanism. The gimbal photographing device further includes a power switch disposed on the fuselage. The folding mechanism includes a base connected to the gimbal camera. When the gimbal camera is unfolded relative to the fuselage, the base abuts against the power switch to turn on the gimbal photographing device. As such, the power switch is provided on the fuselage, and the base is used to trigger the power switch when the gimbal camera is unfolded relative to the fuselage. The gimbal photographing device is thus automatically triggered to be turned on when the gimbal camera is in use.

As shown in FIG. 1 to FIG. 6, a gimbal photographing device 100 of the embodiments of the present disclosure includes a fuselage 10, a folding mechanism 20 connected to the fuselage 10, and a gimbal camera 30 connected to the folding mechanism 20. The gimbal camera 30 can be folded or unfolded relative to the fuselage 10 by the folding mechanism 20. In the present disclosure, the gimbal camera 30 is in a folded state when it is not in operation, and can be in an unfolded state or a folded state during work.

The gimbal camera 30 of the present disclosure includes a gimbal bracket and a camera 301 mounted on the gimbal bracket. A type of the gimbal bracket includes: single-shaft, double-shaft, or multi-shaft gimbal bracket. In the present embodiment, the gimbal bracket is a three-shaft gimbal bracket. The three-shaft gimbal bracket includes a yaw shaft assembly 302 movably connected to a base 21, a roll shaft assembly 303 movably connected to the yaw shaft assembly 302, and a pitch shaft assembly 304 movably connected to the roll shaft assembly 303, that the camera 301 is mounted on the pitch shaft assembly 304. The yaw shaft assembly 302 controls a translational movement of the gimbal camera 30 through a yaw shaft motor, the roll shaft assembly 303 controls a roll motion of the gimbal camera 30 through a roll shaft motor, and the pitch shaft assembly 304 controls a pitch motion of the gimbal camera 30 through a pitch shaft motor, in turn, to control the camera 301 to perform image capturing at different shooting angles, and be able to adjust a position of the gimbal camera 30 according to a required shooting angle.

Figure 1:
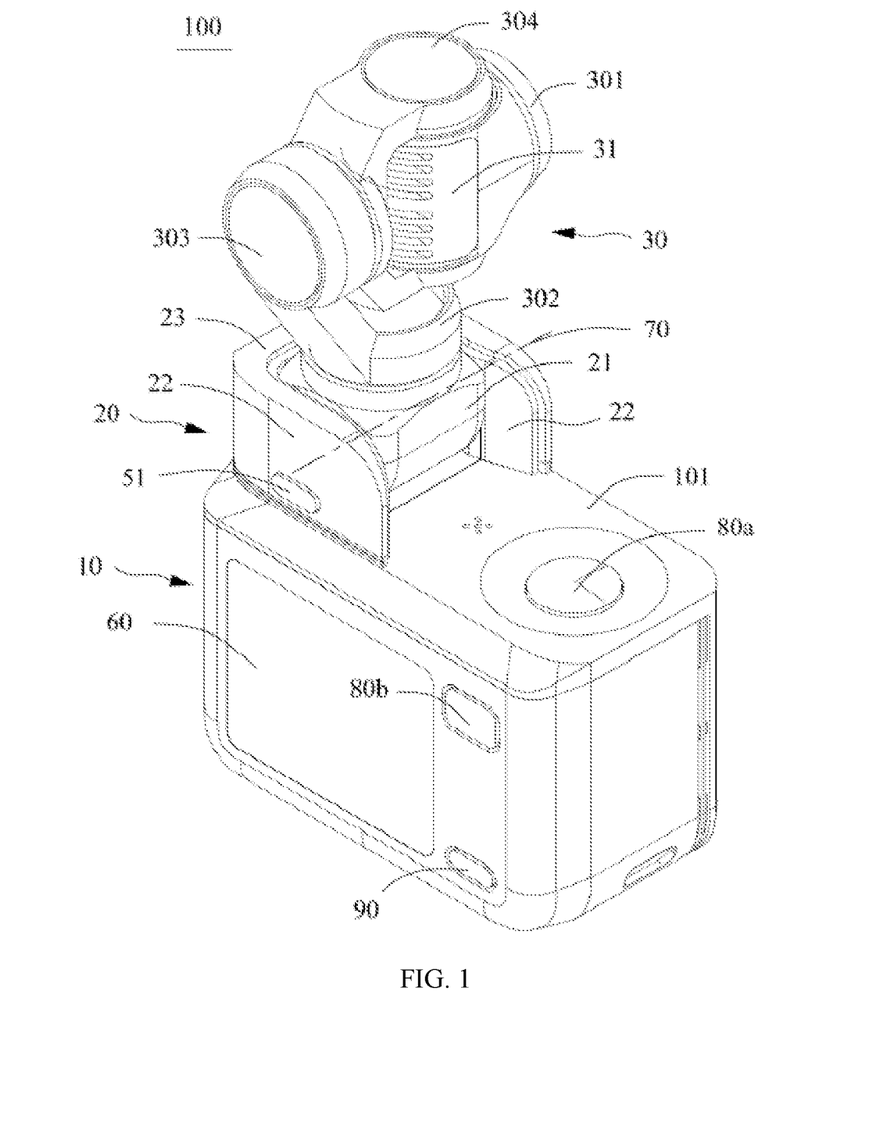
FIG. 1 is a schematic overall structural view of a gimbal photographing device according to an example embodiment of the present disclosure.
Figure 2:
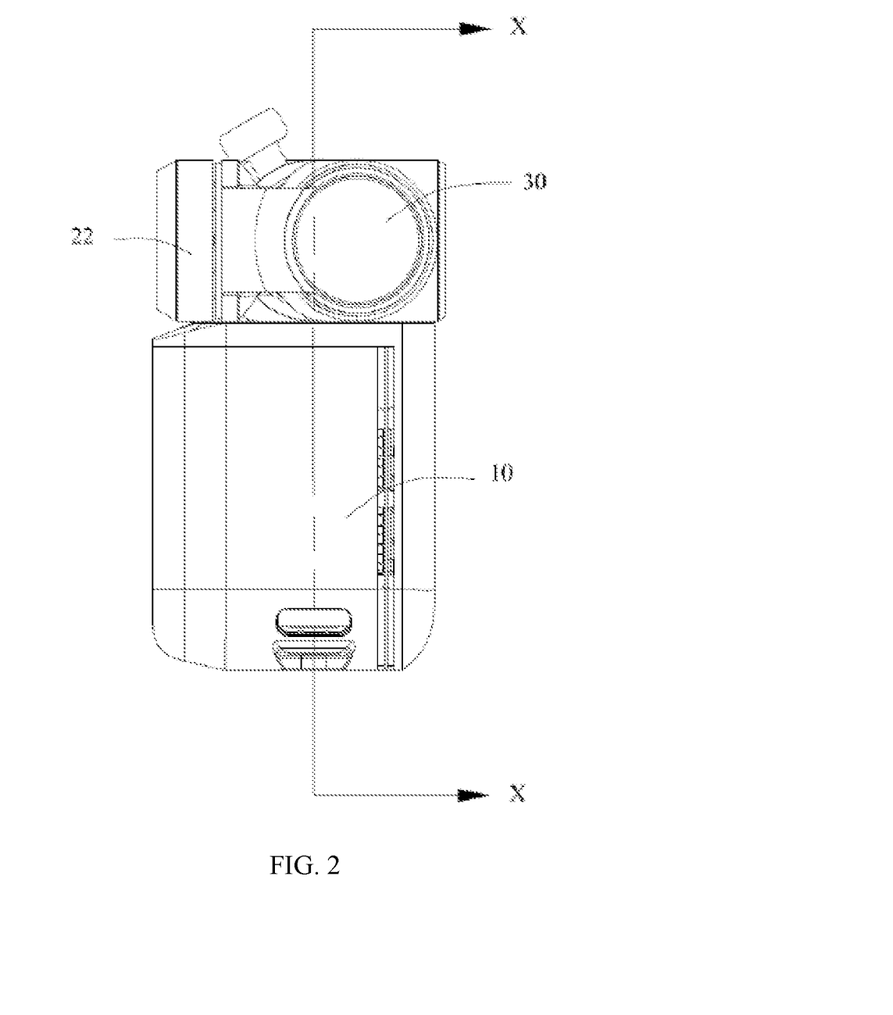
FIG. 2 is a schematic structural view of a gimbal camera folded relative to a fuselage in a gimbal photographing device according to an example embodiment of the present disclosure.
Figure 3:
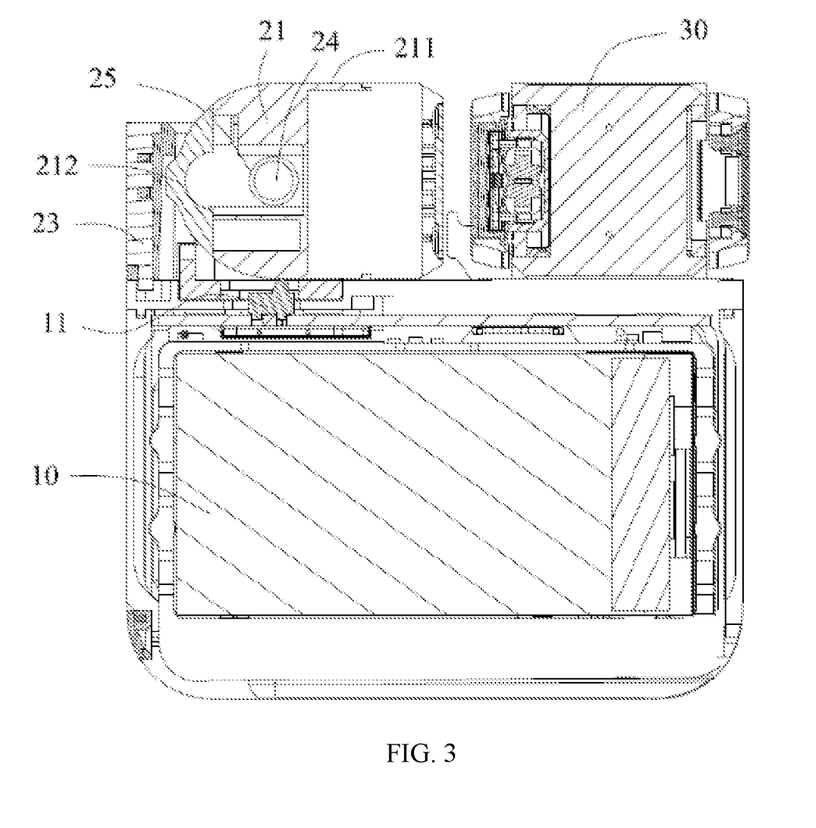
FIG. 3 is a cross-sectional view showing an example embodiment of an X-X direction of FIG. 2.

When the gimbal camera 30 is in a folded state (as shown in FIG. 3), a rotation shaft of the yaw shaft assembly 302 is disposed perpendicular to a rotation axis, a rotation shaft of the roll shaft assembly 303 is disposed parallel to the rotation axis, and a rotation shaft of the pitch shaft assembly 304 is disposed perpendicular to the rotation axis. When the gimbal camera 30 is in an unfolded state (as shown in FIG. 1), the rotation shaft of the yaw shaft assembly 302 is disposed perpendicular to a rotation axis 70, a position of the rotation shaft of the roll shaft assembly 303 relative to the rotation axis 70 can be varied in accordance with a rotation of the yaw shaft assembly 302, and a position of the rotation shaft of the pitch shaft assembly 304 relative to the rotational axis 70 can be varied in accordance with a rotation of the roll shaft assembly 303.

The fuselage 10 includes a supporting wall 101 to support the folding mechanism 20 and the gimbal camera 30. A mounting position of the folding mechanism 20 may be provided at a left edge of the supporting wall 101 of the fuselage 10, or it may be provided at a right edge of the supporting wall 101 of the fuselage 10. In an example shown in FIG. 1, the mounting position of the folding mechanism 20 is provided at the left edge of the supporting wall 101 of the fuselage 10. The fuselage 10 has a rectangular structure, and the supporting wall 101 is located on a top surface of the fuselage 10. Of course, in other embodiments, the fuselage 10 may be any regular or irregular shape, and specific is not limited. The supporting wall 101 may also be located at a side or bottom surface of the fuselage 10.

The folding mechanism 20 includes a base 21 connected to the gimbal camera 30, for driving the gimbal camera 30 to be unfolded or folded relative to the fuselage 10. The base 21 is rotatably connected to the supporting wall 101 about the rotation axis 70, thereby realizing the gimbal camera 30 to switch between the unfolded state (i.e., the gimbal camera 30 being unfolded relative to the fuselage 10) and the folded state (i.e., the gimbal camera 30 being folded relative to the fuselage 10). The rotation axis 70 is disposed in parallel with the supporting wall 101, and a direction that the rotation axis 70 is disposed is as shown in FIG. 1. Of course, the rotational axis 70 of the present disclosure also does not exclude non-parallel settings.

The gimbal photographing device 100 of the present disclosure further includes a power switch 11 provided on the fuselage 10. When the gimbal camera 30 is unfolded relative to the fuselage 10, the base 21 can abut against the power switch 11 to turn on the gimbal photographing device 100. In this embodiment, the power switch 11 is located on a side of the fuselage 10 where the supporting wall 101 is located, and the base 21 realizes triggering of the power switch 11 by a change of a distance from the supporting wall 101 during rotation. For example, when the gimbal camera 30 is in the folded state, the base 21 is not in contact with or is in contact with the power switch 11 but cannot turn the power switch 11 on or off; and when the gimbal camera 30 is in the unfolded state, the base 21 abuts against the power switch 11, such that the power switch 11 is in an on state. There are various methods for the base 21 to abut against the power switch 11. For example, when the gimbal camera 30 is unfolded relative to the fuselage 10, the base 21 presses the power switch 11 from above; or during a process that the gimbal camera 30 is unfolded relative to the fuselage 10, the base 21 moves the power switch 11 to move in a direction to be turned on, and during a process that the gimbal camera 30 is folded relative to the fuselage 10, the base 21 moves the power switch 11 to move in a direction to be turned off. A specific manner in which the base abuts against the power switch 11 so that the power switch 11 is in an on state is not limited.

The base 21 is provided with an abutting portion 212 used to touch-control the power switch 11, and the abutting portion 212 and the gimbal camera 30 are respectively located at two sides of the base 21. When the gimbal camera 30 is unfolded relative to the fuselage 10, the abutting portion 212 is located at a bottom of the base 21, such that the abutting portion 212 faces the power switch 11, thereby triggering a turn-on of the power switch 11. In this embodiment, when the gimbal camera is switched from the folded state to the unfolded state, the power switch is touch-controlled by the abutting portion on the base, thereby realizing that the gimbal camera automatically triggers a turn-on of the gimbal photographing device during use, simplifying operation steps, and improving user experience.

Figure 6:
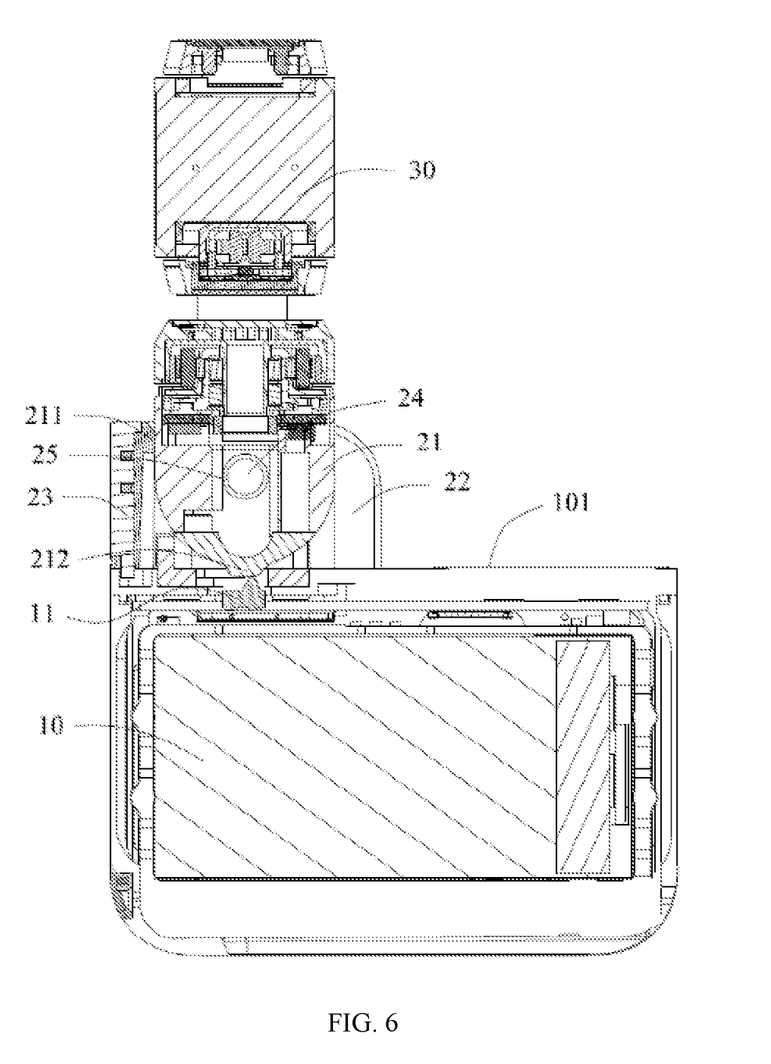
FIG. 6 is a schematic cross-sectional view of a Y-Y direction of FIG. 5.
Figure 7:
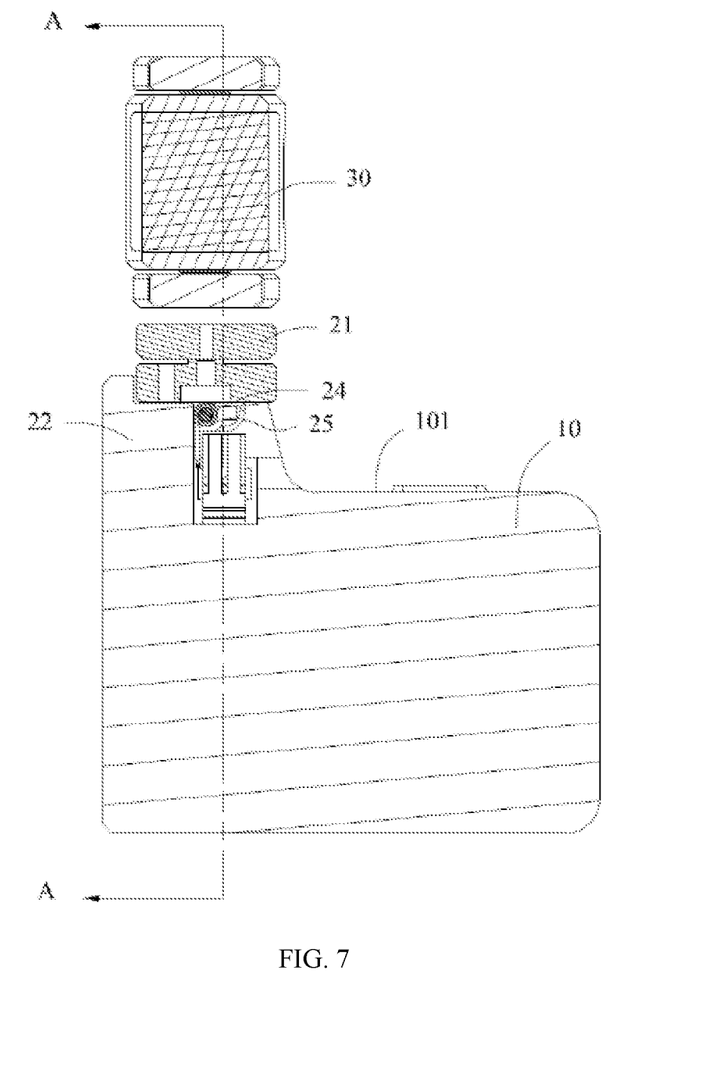
FIG. 7 is a schematic cross-sectional view of a gimbal photographing device according to an example embodiment of the present disclosure.
Figure 8:
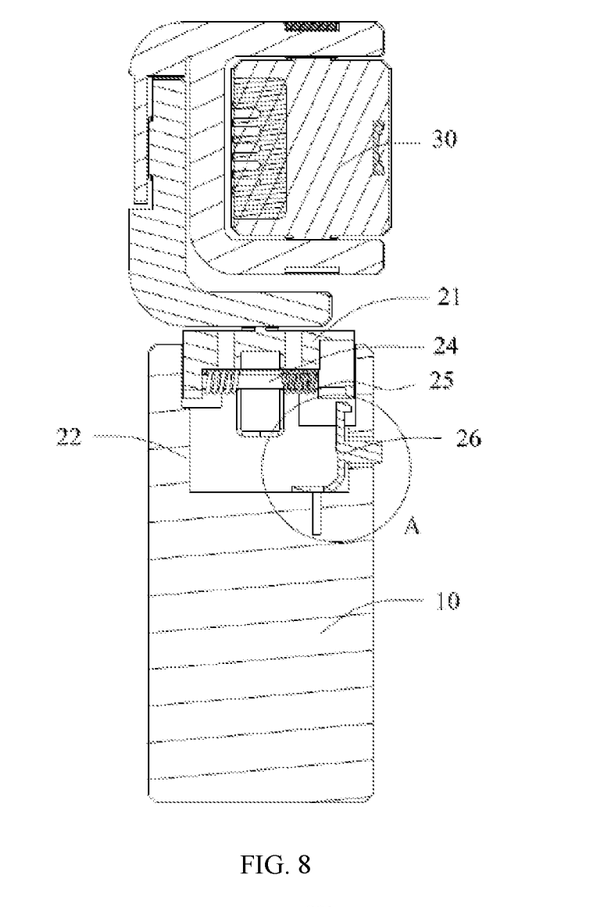
FIG. 8 is a schematic cross-sectional view of an A-A direction of FIG. 7.
Figure 9:
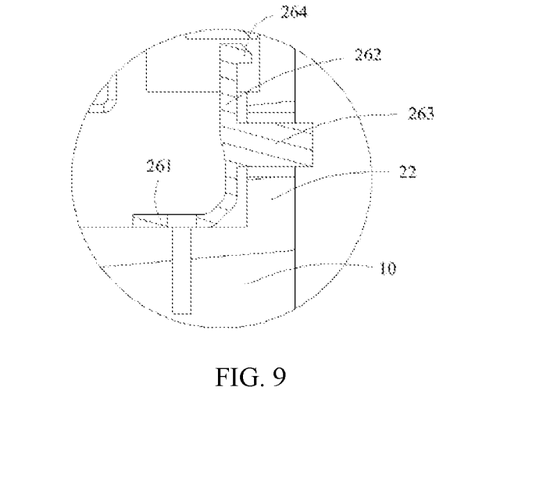
FIG. 9 is an enlarged schematic view of a portion A of FIG. 8.
Figure 10:
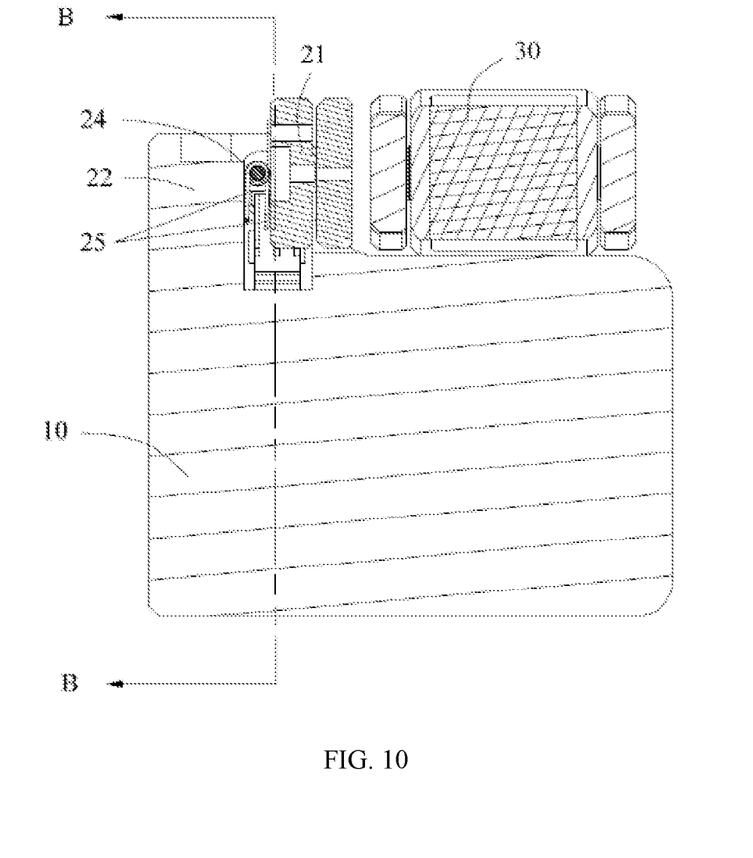
FIG. 10 is a schematic cross-sectional view showing a gimbal photographing device according to another example embodiment of the present disclosure.
Figure 11:
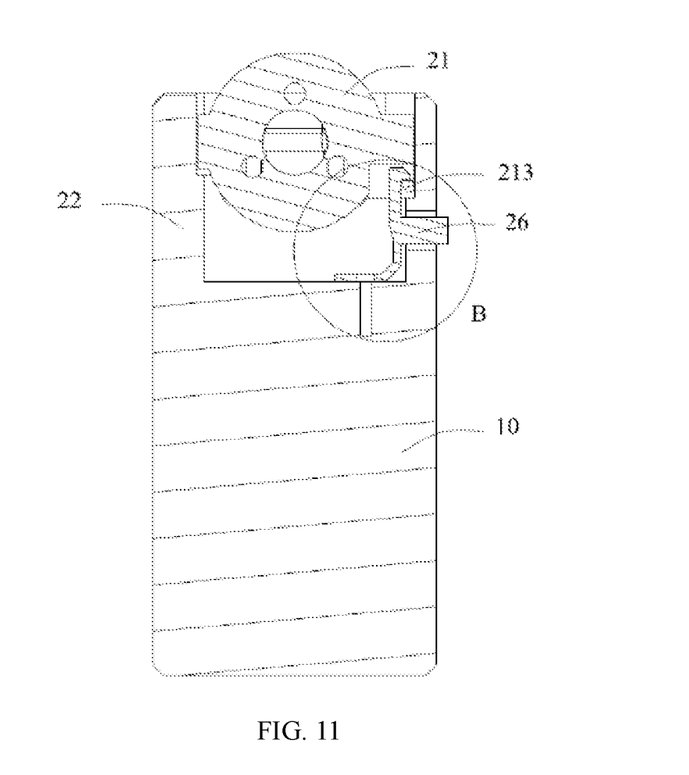
FIG. 11 is a schematic cross-sectional view of B-B of FIG. 10.
Figure 12:
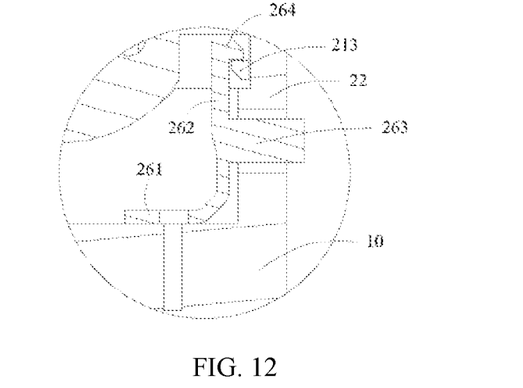
FIG. 12 is an enlarged schematic view of a portion B of FIG. 11.

As shown in FIG. 3 and FIG. 6, the abutting portion 212 is a convex structure. The power switch 11 can partially protrude from the supporting wall 101, or does not extend beyond the supporting wall 101. A protruding amplitude of the abutting 212 depends on a designed position of the power switch 11. For example, when the power switch 11 partially protrudes from the supporting wall 101, the protruding amplitude of the convex structure may be relatively smaller; and when the power switch 11 does not extend beyond the supporting wall 101, the protruding amplitude of the convex structure is relatively larger.

Further, the folding mechanism 20 further includes supporting components 22 disposed on the fuselage 10, and the base 21 is rotatably connected to the supporting components 22. Optionally, the supporting components 22 can be a connecting side wall, and the connecting side wall extends upward from the supporting wall 101 and is integrally formed with the fuselage 10. Of course, the supporting components 22 of the present disclosure is not limited thereto, and the supporting components 22 can also be a supporting structure of any structure.

The folding mechanism 20 further includes a limiting component 23 disposed on the fuselage 10 for limiting a rotation angle of the gimbal camera 30 relative to the fuselage 10. In an alternative embodiment, the supporting components 22 have two supporting components, and the two supporting components 22 are oppositely disposed. The limiting component 23 is connected to a same end of the two supporting components 22, and the limiting component 23 can cooperate with the supporting components 22 to clamp the base 21, such that a connection of the base 21 is more stable. Optionally, the limiting component 23 extends upward from the supporting wall 101 and is integrally formed with the fuselage 10. After the base 21 drives the gimbal camera 30 to rotate to the unfolded state, the base 21 abuts against the limiting component 23, and a position of the gimbal camera 30 is limited by cooperation of the limiting component 23 and the base 21, to keep the position of the gimbal camera 30 in the unfolded state stable.

Figure 4:
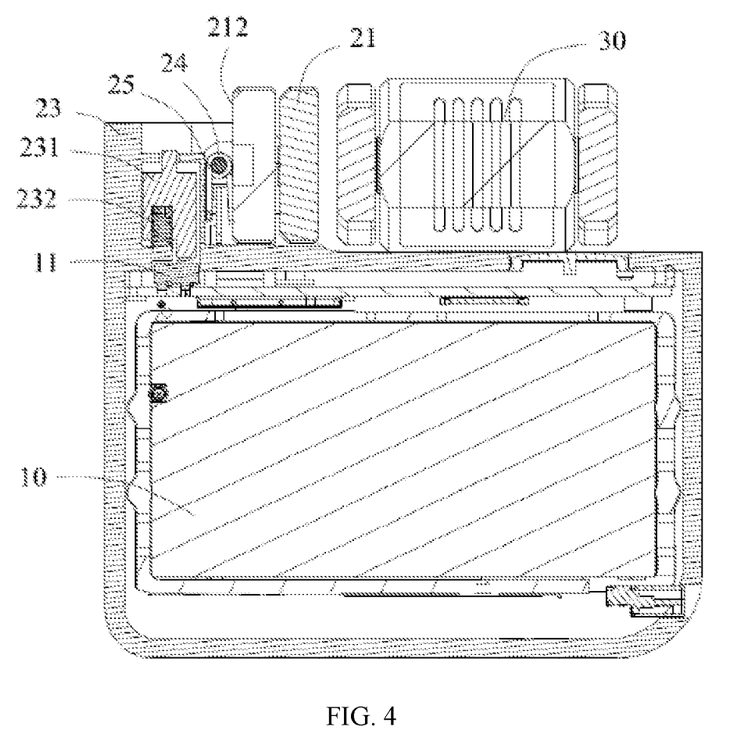
FIG. 4 is a cross-sectional view showing another example embodiment of the X-X direction of FIG. 2.
Figure 5:
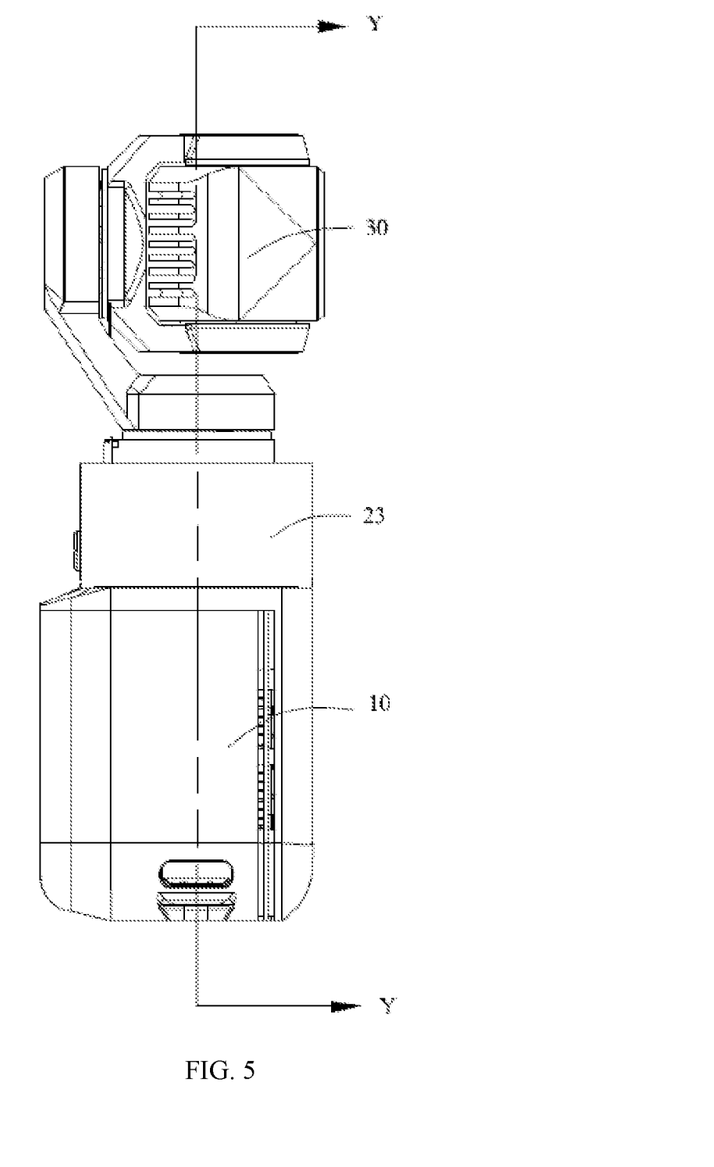
FIG. 5 is a schematic structural view showing a gimbal camera unfolded relative to a fuselage in a gimbal photographing device according to an example embodiment of the present disclosure.

As shown in FIG. 4 and FIG. 6, the folding mechanism 20 further includes a transmission component 231 disposed in the limiting component 23, and an elastic component 232 connected to the transmission component 231. The base is provided with the abutting portion 212, and the transmission component 231 corresponds to the power switch 11. When the gimbal camera 30 is unfolded relative to the fuselage 10, the abutting portion 212 abuts against the transmission component 231, so that the transmission component 231 triggers the power switch 11 to be turned on, and the elastic component 232 is in a compressed state. After the abutting portion 212 is disengaged from the transmission component 231, the transmission component 231 is disengaged from the power switch 11 under a restoring force of the elastic component 232. For example, the elastic component 232 is abutted between the transmission component 231 and the limiting component 23. The transmission component 231 has protrusions to match and cooperate with the abutting portion 212 and the power switch 11, in which, the elastic component 232 can be a spring, an elastic plastic, an elastic rubber, etc. In this embodiment, the elastic component 232 is a spring, and a moving direction of the transmission component 231 is the same as an axial direction of the spring 232.

The gimbal photographing device 100 of the present disclosure realizes a folding function of the gimbal camera 30, by the base 21 of the folding mechanism 20 to drive the gimbal camera 30 to switch between the unfolded state and the folded state. When the gimbal camera 30 is unfolded and operates, a position of the gimbal camera 30 is limited by cooperation of the limiting component 23 and the base 21, so that the position of the gimbal camera 30 in the unfolded state is kept stable. When the gimbal camera 30 is not in operation, the gimbal camera 30 can be folded to fit to the fuselage 10, to reduce a volume of the gimbal photographing device 100 to solve the problem that the gimbal camera 30 takes up a large space when it is not in operation, and prevent the gimbal camera 30 from swaying when it is not in operation, thereby better realizing portable carrying and storage of the gimbal photographing device 100, and an integrated compact design.

An end of the camera 301 of the gimbal camera 30 away from the limiting component 23 is provided with a bonding surface 31. When the gimbal camera 30 is not in operation, the base 21 drives the gimbal camera 30 to rotate to the folded state, and the bonding surface 31 is attached to the supporting wall 101. In an alternative embodiment, when the power switch 11 protrudes from the supporting wall 101, there is a spacing between the base 21 and the fuselage 10, which ensures that the base 21 does not trigger the power switch 11. In another alternative embodiment, when the power switch 11 does not extend beyond the supporting wall 101, the base 21 can be attached to the fuselage 10, such that when the base 21 is folded relative to the fuselage 10, the power switch 11 is also not triggered. By cooperation of the bonding surface 31 of the gimbal camera 30 and the supporting wall 101 of the fuselage 10, a position of the gimbal camera 30 is limited, thereby reducing the volume of the gimbal photographing device 100, keeping the position of the gimbal camera 30 in the folded state stable when it is not in operation, and preventing the gimbal camera 30 from swaying.

Referring to FIG. 1 to FIG. 6 again, an end of the base 21 adjacent to the limiting component 23 is provided with an abutting surface 211. The base 21 drives the gimbal camera 30 to rotate to the unfolded state, the abutting surface 211 abuts against the limiting component 23, and a position of the gimbal camera 30 is limited by cooperation of the limiting component 23 and the abutting surface 211 of the base 21, so that the position of the gimbal camera 30 in the unfolded state is kept stable.

To make the position of the gimbal camera 30 in the folded state more stable, fixing structures that fit each other may be provided on the bonding surface 31 of the gimbal camera 30 and a position on the supporting wall 101 of the fuselage 10 corresponding to the bonding surface 31 of the gimbal camera 30, to make the gimbal camera 30 less likely to sway when it is attached to the supporting wall 101 of the fuselage 10. For example, the fixing structures that fit each other may be one of a snap structure or a magnet attraction structure or a lock structure.

The gimbal photographing device 100 of the present disclosure further includes a display screen 60 disposed on the fuselage 10, and the display screen 60 is communicatively connected to the gimbal camera 30 for displaying pictures taken by the gimbal camera 30. The display screen 60 is mounted on a side of the fuselage 10 so that it can be viewed by a user when photographing.

The power switch 11 of the present disclosure can also be used to turn on or off the display screen 60. The power switch 11 in this embodiment is used to control the power-on of the gimbal photographing device 100. In an optional embodiment, the fuselage 10 is further provided with a button that can control the camera 301 to take a picture (which may be image capture or video capture). Optionally, the supporting wall 101 of the fuselage 10 may be provided with a first button 80a (the first button 80a shown in the drawings is disposed on a top surface of the fuselage 10), for the user to operate the camera 301 for photographing when the gimbal camera 30 is in the unfolded state. Optionally, a second button 80b may be disposed on a side wall of the fuselage 10 adjacent to the supporting wall 101 (the second button 80b shown in the drawings is disposed on a side of the fuselage 10). For example, the second button 80b is disposed on a side of the fuselage 10 away from lens of the camera 301, for the user to operate the camera 301 for photographing when the gimbal camera 30 is in the folded state. So that the gimbal camera 30 can still be used for photographing when it is in the folded state. In addition, when the gimbal camera 30 is in the unfolded state, the second button 80b can also adjust the gimbal bracket of the gimbal camera 30 to change a photographing angle of the camera 301, and switch a photographing mode of the camera 301. For example, when the gimbal camera 30 is in the unfolded state, pressing the second button 80b once can switch the photographing mode of the camera 301 between an image capture mode and a video capture mode. Pressing the second button 80b twice continuously can adjust the gimbal bracket to a returned state to realize an automatic return function. Pressing the second button 80b three times continuously can control the yaw shaft assembly 302 of the gimbal bracket to rotate, so that the camera 301 is turned toward the user to implement a selfie function. In another embodiment, the second button 80b can also include a plurality of buttons, and different buttons can be used to control the different functions described above. It can be understood that the number of times that the button is pressed continuously and the corresponding realized modes of the gimbal camera 30 can be set according to requirements, and is not limited to the embodiments.

Further, a power button 90 is further disposed on the fuselage 10 for turning on or off the gimbal photographing device 100. Optionally, the power button 90 is provided on a side wall of the fuselage 10 adjacent to the supporting wall 101. In an example shown in the drawings, the display screen 60, the second button 80b, and the power button 90 are provided on a same side of the fuselage 10, that is, on the side of the fuselage 10 facing away from the camera 301. In another alternative embodiment, the gimbal photographing device 100 may include a mounting bracket that is mounted to the fuselage 10 for mounting an external display device. The external display device may be a device capable of receiving images captured by the camera 301, such as a mobile phone or a tablet computer, and the like, which is also viewable by the user when photographing.

In the present disclosure, when the gimbal camera 30 is rotated from the unfolded state to the folded state, a positional change process of the gimbal camera 30 is first rotated from a position of standing on the supporting wall 101 of the fuselage 10 as shown in FIG. 1, to a position of tilting to the supporting wall 101 of the fuselage 10, and then rotated from the position of tilting to the supporting wall 101, to a position of attaching to the supporting wall 101 of the fuselage 10 as shown in FIG. 3. When the gimbal camera 30 is rotated from the folded state to the unfolded state, a positional change process of the gimbal camera 30 is first rotated from the position of attaching to the supporting wall 101 of the fuselage 10 as shown in FIG. 3, to the position of tilting to the supporting wall 101 of the fuselage 10, and then rotated from the position of tilting to the supporting wall 101 of the fuselage 10, to the position of standing on the supporting wall 101 of the fuselage 10 shown in FIG. 1.

When the gimbal camera 30 is operating in the unfolded state, the camera 301 can be operated by the first button 80a to perform photographing. When the gimbal camera 30 needs to work in the folded state, the camera 301 can be operated by the second button 80b to perform photographing.

The base 21 of the present disclosure is connected to the supporting components 22 via a rotating shaft 24, and the rotating shaft 24 can take a variety of different rotational forms, such as an integral rotating shaft, a rotating shaft with a positioning shaft, a damper shaft, a spring shaft, and the like. In an alternative embodiment, the rotating shaft 24 is connected between the two supporting components 22 through the base 21, and the base 21 rotates with the rotating shaft 24 as an axis. In another alternative embodiment, the base 21 can rotate with the rotating shaft 24 as an axis, by being respectively provided with the rotating shaft 24 at two ends, and connecting the rotating shaft 24 to the supporting components 22 on a corresponding side of the base 21.

Further, the folding mechanism 20 further includes a locking cap 51 detachably mounted on the supporting components 22, and the locking cap 51 can cooperate with the rotating shaft 24 to lock the gimbal camera 30 in the unfolded state. For example, the rotating shaft 24 has a structure that cooperates with the locking cap 51, for example, a hexagon or any other shape. Correspondingly, the supporting components 22 are provided with a receiving groove (not shown) for engaging with the locking cap 51. When the locking cap 51 is fitted in the receiving groove, the locking cap 51 cannot be rotated relative to the supporting components 22, so that the locking cap 51 is limited within the supporting components 22. When the gimbal camera 30 is rotated to the unfolded state, the gimbal camera 30 is fixed to the fuselage 10 via the locking cap 51 being mounted to the supporting components 22 and cooperating with the rotating shaft 24. Of course, in other embodiments, when the gimbal camera 30 is rotated relative to the fuselage 10, the locking cap 51 also cooperates with the rotating shaft 24 to cause the gimbal camera 30 to be in a plurality of different photographing angles that are locked.

As shown in FIG. 1 to FIG. 12, the gimbal photographing device 100 further includes a resetting component 25 disposed on the rotating shaft 24. In this embodiment, when no external force acts on the gimbal camera 30 and the base 21, the gimbal photographing device 100 can be automatically rotated from the folded state to the unfolded state via the resetting component 25. In another alternative embodiment, the resetting component 25 can be combined with the above-described automatic turning-on embodiments, and the gimbal photographing device 100 can be automatically rotated from the folded state to the unfolded state via the resetting component 25, at which time the abutting portion 212 of the base 21 abuts against the power switch 11, thereby realizing the automatic turning on of the gimbal photographing device 100.

When the gimbal camera 30 is unfolded relative to the fuselage 10, the resetting component 25 is in an initial state; and when the gimbal camera 30 is folded relative to the fuselage 10, the resetting component 25 is in a twisted state, and causes the gimbal camera 30 to be subjected to a restoring force to be unfolded relative to the fuselage 10, such that the resetting component 25 can drive the gimbal camera 30 to be in the unfolded state. In an alternative embodiment, the resetting component 25 is a torsion spring sleeved on the rotating shaft 24. One end of the torsion spring abuts against the limiting component 23, and the other end abuts against the base 21. When the base 21 rotates with the rotating shaft 24 as an axis to rotate the gimbal camera 30 relative to the fuselage 10 to the folded state, since one end of the torsion spring is limited, and the other end rotates with the base 21, so that the torsion spring generates a torque force, so that the gimbal camera 30 of the present disclosure can be automatically switched to a use state when in the folded state.

Further, the gimbal photographing device 100 further includes a locking assembly 26 disposed on the supporting components 22 for engaging the base 21 to lock the gimbal camera 30 in the folded state, since the resetting component 25 is disposed in the base 21 so that the gimbal camera 30 is always in the unfolded state when no external force is applied. To lock the gimbal camera 30 in the folded state, the locking assembly 26 is provided on the supporting components 22. When the gimbal camera 30 is rotated to the folded state, the base 21 is locked by the locking assembly 26 to keep the gimbal camera 30 in the folded state; and after the locking assembly 26 is unlocked to the base 21, the base 21 returns to the unfolded state under a force of the resetting component 25.

In an alternative embodiment, the locking assembly 26 includes a locking hook 264, and the base 21 is provided with a lock fitting portion 213 that cooperates with the locking hook 264 to lock. When the gimbal camera 30 is folded relative to the fuselage 10, the locking hook 264 cooperates with the lock fitting portion 213 to lock, so that the gimbal camera 30 is kept in the folded state. Further, the locking assembly 26 further includes a body portion 261 fixed to the fuselage 10, an elastic arm 262 bending and extending from the body portion 261, and a regulating portion 263 disposed on the elastic arm 262. The locking hook 264 is disposed at a free end of the elastic arm 262. When the elastic arm 262 is in an initial state, the regulating portion 263 protrudes from the supporting components 22, and the locking hook 264 is in a state of being locked with the lock fitting portion 213; and the regulating portion 263 is retracted into the supporting components 22 under external force pressing, to deform the elastic arm 262 to disengage the locking hook 264 from the lock fitting portion 213, so that the base 21 can freely rotate.

In the present disclosure, when the gimbal camera 30 is rotated from the unfolded state to the folded state, the positional change process of the gimbal camera 30 is first rotated from the position of standing on the supporting wall 101 of the fuselage 10 as shown in FIG. 1, to the position of tilting to the supporting wall 101 of the fuselage 10, and then rotated from the position of tilting to the supporting wall 101 of the fuselage 10, to the position of attaching to the supporting wall 101 of the fuselage 10 as shown in FIG. 3. When the gimbal camera 30 is rotated from the folded state to the unfolded state, the positional change process of the gimbal camera 30 is first rotated from the position of attaching to the supporting wall 101 of the fuselage 10 as shown in FIG. 3 to the position of tilting to the supporting wall 101 of the fuselage 10, and then rotated from the position of tilting to the supporting wall 101 of the fuselage 10, to the position of standing on the supporting wall 101 of the fuselage 10 shown in FIG. 1. In which, when the gimbal camera 30 is folded relative to the fuselage 10, the locking assembly 26 is fitted to the lock fitting portion 213 on the base 21 to lock the base 21 to maintain the gimbal camera 30 in the folded state. When the gimbal camera 30 is in the unfolded state, the locking assembly 26 is unlocked to the base 21 by pressing the regulating portion 263 of the locking assembly 26, and the base 21 is automatically rotated to the unfolded state by the force of the resetting component 25.

Further, when the gimbal camera 30 is operating in the unfolded state, the camera 301 can be operated by the first button 80a to perform photographing. When the gimbal camera 30 needs to work in the folded state, the camera 301 can be operated by the second button 80b to perform photographing.

The present disclosure designs the gimbal photographing device capable of being automatically turned on, and the gimbal photographing device realizes a folding function of the gimbal camera, by the base of the folding mechanism to drive the gimbal camera to switch between the unfolded state and the folded state, so that the gimbal photographing device is convenient to carry and store, and has an integrated and compact structure design. In this embodiment, the power switch is disposed on the fuselage, and it is realized to automatically trigger a turn-on of the gimbal photographing device when the gimbal camera is in use, by using the base to trigger the power switch, when the gimbal camera is unfolded relative to the fuselage.

Other embodiments of the present disclosure will be readily apparent to those skilled in the art, after considering specifications and practicing the present disclosure herein. The present disclosure is intended to cover any variations, uses, or adaptations of the present disclosure, which are in accordance with general principles of the present disclosure and include common general knowledge or conventional technical means in the art that are not disclosed in the present disclosure. The specifications and examples are to be regarded as illustrative only, and the true scope and spirit of the invention is indicated by the claims of the present disclosure.

It is to be understood that the present disclosure is not limited to the precise structures that have been described above and illustrated in the drawings, and various modifications and changes can be made without departing from the scope. The scope of the invention is limited only by the following claims.

What is claimed is:

1. A gimbal photographing device, comprising:
   a fuselage;
   a folding mechanism, connected to the fuselage;
   a gimbal camera including a gimbal bracket and a camera, the gimbal camera being connected to the folding mechanism, wherein the gimbal bracket is a multi-shaft gimbal bracket including more than one shaft, the gimbal bracket and the camera as a whole is foldable and unfoldable to change an angle of the gimbal bracket relative to the fuselage via the folding mechanism; and
   a power switch, disposed on the fuselage, wherein:
     the folding mechanism includes a base connected to the gimbal camera, and
     when the gimbal camera is unfolded relative to the fuselage, the base is configured to abut against the power switch to turn on the gimbal photographing device.

2. The gimbal photographing device of claim 1, wherein the folding mechanism further includes supporting components disposed on the fuselage, and the base is rotatably connected to the supporting components.

3. The gimbal photographing device of claim 2, further comprising a limiting component, disposed on the fuselage, to limit a rotation angle of the gimbal camera relative to the fuselage.

4. The gimbal photographing device of claim 1, further comprising a first button, disposed on the fuselage to control photographing of the gimbal camera.

5. A gimbal device, comprising:
a fuselage;
a folding mechanism connected to the fuselage;
a gimbal bracket connected to the folding mechanism, wherein the gimbal bracket is multi-shaft gimbal bracket including more than one shaft, the gimbal bracket as a whole is foldable to change an angle of the gimbal bracket relative to the fuselage via the folding mechanism, and the gimbal bracket is configured to switch between an unfolded state and a folded state relative to the fuselage; and
a power control component configured to, when the gimbal bracket is unfolded relative to the fuselage, turn on the gimbal device.

6. The gimbal device of claim 5, wherein a power button is disposed on the fuselage for turning on or off the gimbal device.

7. The gimbal device of claim 5, wherein the folding mechanism includes a base connected to the gimbal bracket, the base being configured to drive the gimbal bracket relative to the fuselage to switch between the unfolded state and the folded state.

8. The gimbal device of claim 5, wherein the gimbal bracket includes at least two rotation shafts, the gimbal bracket as whole is foldable relative to the fuselage through a folding shaft, and the folding shaft is perpendicular to one or more of the at least two rotation shafts.

9. The gimbal device of claim 5, wherein the gimbal bracket is configured to mount a camera.

10. The gimbal device of claim 5, further comprising a limiting component disposed on the fuselage and configured to limit a rotation angle of the gimbal bracket relative to the fuselage.

11. The gimbal device of claim 5, further comprising a first button disposed on the fuselage to control photographing of the gimbal device.

12. A gimbal device, comprising:
a fuselage;
a folding mechanism connected to the fuselage;
a gimbal bracket connected to the folding mechanism, wherein the gimbal bracket is a multi-shaft gimbal bracket including more than one shaft, the gimbal bracket as a whole is foldable relative to the fuselage to switch between an unfolded state and a folded state via the folding mechanism; and
a power switch provided on the fuselage;
wherein:
the folding mechanism includes a rotatable base connected to the gimbal bracket;
the fuselage includes a supporting wall; and
the power switch is located at a side of the fuselage where the supporting wall is located, the power switch being configured to be triggered by a change of a distance between the base and the support wall due to rotation of the base.

13. The gimbal device of claim 12, wherein the base is configured to drive the power switch to move during the rotation of the base.

14. The gimbal device of claim 13, wherein the base is configured to, during a process that the gimbal bracket moves from the folded state to the unfolded state relative to the fuselage, drive the power switch to move in a direction to be turned on.

15. The gimbal device of claim 13, wherein the base is configured to, during a process that the gimbal bracket moves from the unfolded state to the folded state relative to the fuselage, drive the power switch to move in a direction to be turned off.

16. The gimbal device of claim 12, wherein the gimbal bracket is configured to mount a camera.

17. The gimbal device of claim 12, wherein the gimbal bracket includes at least two rotation shafts, the gimbal bracket as whole is foldable relative to the fuselage through the base rotating around a folding shaft, and the folding shaft is perpendicular to one or more of the at least two rotation shafts.

18. The gimbal device of claim 12, wherein a power button is disposed on the fuselage for turning on or off the gimbal device.

19. The gimbal device of claim 12, further comprising a limiting component disposed on the fuselage and configured to limit a rotation angle of the gimbal bracket relative to the fuselage.

20. The gimbal device of claim 12, further comprising a first button disposed on the fuselage to control photographing of the gimbal device.

* * * * *